Dec. 29, 1964

W. R. STRONG, JR 3,163,393

COMPONENT HOLDER

Filed Dec. 23, 1963

INVENTOR.
WALTER R. STRONG JR.
BY
Moody and Phillion
ATTORNEYS 3,163,393

COMPONENT HOLDER

Walter R. Strong, Jr., Cedar Rapids, Iowa, assignor to Collins Radio Company, Cedar Rapids, Iowa, a corporation of Iowa Filed Dec. 23, 1963, Ser. No. 332,604
14 Claims. (Cl. 248—223)

This invention relates generally to component holders and, more specifically, to a transistor holder of an improved design.

One of the current problems in mounting transistors arises from the fact that the dimensions of the transistor cases vary considerably from manufacturer to manufacturer and sometimes the case sizes will even vary from batch to batch with the same manufacturer. Such variation in size results in mounting difficulty since it is uneconomical to provide a number of different sizes of transistor holders to accommodate the various sizes of transistor cases. One prior art solution to the problem has been the use of spring clips which will accommodate different size transistor cases. However, spring clips require insulation and add materially to the expense of the holder.

A primary object of the present invention is a simple and reliable transistor holder which does not require spring clips.

A second object of the present invention is an inexpensive transistor holder which will hold transistors whose case dimensions can vary considerably.

A third object of the invention is the improvement of transistor holders, generally.

In accordance with the invention, there is provided a cylindrically shaped cup-like receptacle of a flexible material and opened at one end to receive the transistor casing. One of the flexible insulative materials is a suitable material, for example. The other end of the cup-like holder is substantially closed with a pin extending away therefrom and along the axis thereof. The pin passes through a chassis or mounting board and is employed to secure the holder onto said mounting board. The closed end of the receptacle is chamfered inwardly to the pin extending therefrom to form a generally concave surface from the periphery of the receptacle base to the base of the pin extending therefrom. The cylindrical wall of the holder has axially aligned slots therein to divide said wall into segments.

In accordance with a feature of the invention, the segmented cylindrical wall of the cup-like structure permits the inward movement of said segments onto transistor casings of various sizes and to grip a wide range of sizes effectively and firmly. More specifically, when the cup-like holder is forced against a mounting board the bottom surface thereof will tend to flatten against said mounting board and will produce an inward movement of the separate sections of the receptacle wall to grip the transistor case therein.

In accordance with another feature a ring-shaped groove is formed generally circumferentially around the inner surface of said cup-like receptacle and near the open end thereof. This groove is employed to grip a lip ordinarily formed on transistor casings.

The above-mentioned and other objects and features of the invention will be more fully understood from the following detailed description thereof when read in conjunction with the drawings, in which.

Figures 1, 2, 3:
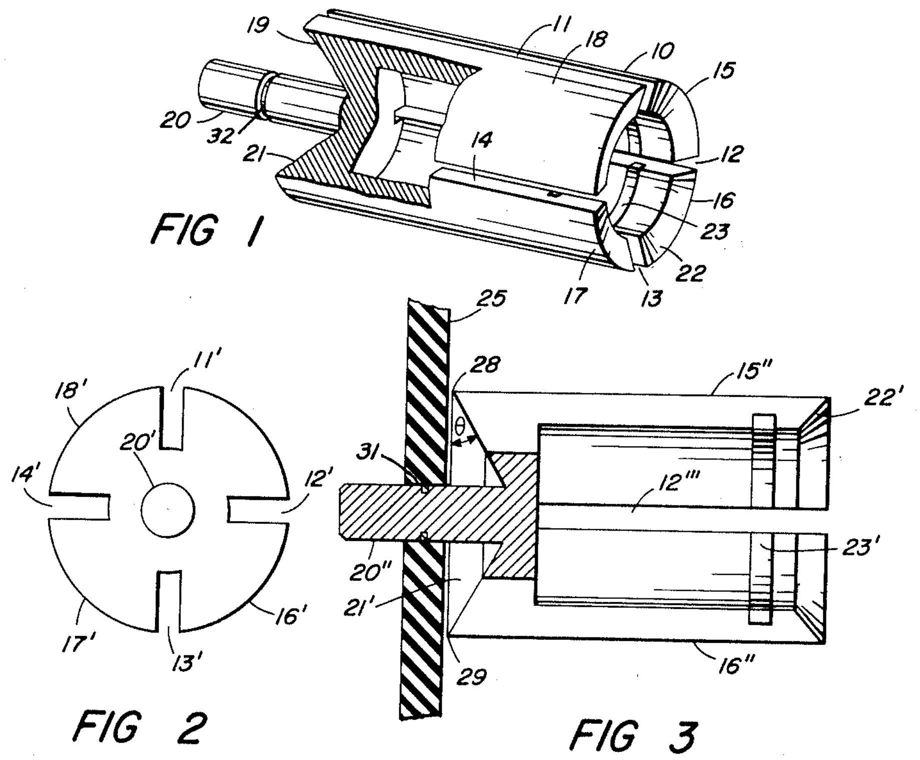
FIG. 1 shows a perspective view of the invention.
FIGS. 2 and 3 show an end view and a side view of the structure of FIG. 1, respectively; and, FIG. 4 shows a side view of the structure after it has been pressed against a mounting board.

In FIG. 1 the transistor holder, shown in perspective, is comprised of a cylindrically shaped cup-like element with four slots cut through the wall 10 thereof. Such slots are cut parallel to the axis of the cup-like element and divide the wall thereof into four arcuate elements 15, 16, 17, and 18. The open end of the holder is chamfered in a concave manner as shown by surface 22 to facilitate the insertion of the transistor casing into the holder. Just inside the opening of the transistor holder is a groove 23 which is cut into the inner surface thereof and positioned circumferentially around said inner surface. Such groove is provided to hold the lip which is provided on the ends of most transistor casings.

Figure 4:
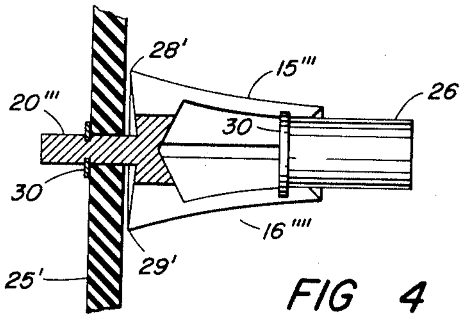

At the other end of the transistor holder is a pin 20 secured to the base thereof and which is caused to pass through a hole in a mounting board, such as the mounting board 25 of FIG. 3. The pin 20 is employed to secure the holder to the mounting board by some appropriate means such as, for example, a snap washer 30 which engages groove 32 in the pin (FIG. 4). The bottom of the transistor holder, designated generally by the reference character 21, can be seen from the drawings to be chamfered inwardly from the perimeter of the bottom of the holder to the base of the pin 20 to form a generally concave surface.

While many variations of design are possible, it has been found that a suitable angle $\theta$ of concavity of 15° provides good results.

In mounting the holder on a board the pin 25 is inserted through a hole 31 provided therefor in the board 25, as shown in FIG. 3. By pressing the holder firmly onto the board 25, the perimeter (represented by reference characters 28 and 29) of the base of the holder will be forced outwardly from the axis of the holder, as shown in FIG. 4, and will cause the other ends of the four arcuate sections 15, 16, 17, and 18 to move inwardly and grip the lip 30 of the transistor casing 26 which can be inserted therein after the pressing of the holder onto the board 25.

After the holder has been pressed onto the board and assumed the shape, as shown in FIG. 4, suitable means such as snap washer 30 or some other type grip fastener can be placed on the pin 20 to hold the transistor holder firmly against the mounting board 25'.

In FIG. 2 there is shown an end view of the transistor holder and it can be seen that the four slots 11', 12', 13', and 14' are spaced 90° apart. Such spacing is not critical and five slots or three slots, or some other number of slots, can be employed in the device. The important feature is that the slots function to permit the arcuate segments of the walls forming the holder to move inwardly to grip the transistor casing when the holder is pressed against a mounting board.

It is to be understood that the form of the invention shown herein is but a preferred embodiment thereof and that various changes may be made in size, proportion, and materials without departing from the spirit or scope of the invention.

I claim:

1. Component holder means mountable upon a mounting board and comprising:

receptacle means having cylindrical shaped side wall and closed at one end and open at the other end;

said cylindrically shaped side wall of said receptacle means comprised of arcuate segments separated one from the other by slots cut through said cylindrically shaped side wall and running axially along the length of said side wall and extending through the closed end of said receptacle means;

the outside surface of said closed end of said receptacle means being generally concave in shape;

and fastening means extending outwardly from said closed end and substantially along the axis of said receptacle means and constructed to secure said component holder means to said mounting board.

2. Component holder means in accordance with claim 1 in which the inner surface of said cylindrically shaped side wall is constructed to grip the component inserted therein when said receptacle means is forced against said mounting board.

3. Component holder means in accordance with claim 2 in which the open end of said receptacle means is chamfered inwardly from the outside wall surface to the inside wall surface.

4. Component holder means in accordance with claim 3 in which the closed end of said receptacle means is constructed to contain continuations of the slots cuts in the side wall of said receptacle means.

5. Component holder means in accordance with claim 1 in which the inner surface of said cylindrical side wall has a groove formed therein substantially circumferentially around said cylindrical side wall and near the open end of said receptacle means;

said groove constructed to grip and hold a lip on a component inserted therein when said receptacle means is forced against said mounting board.

6. Component holder means in accordance with claim 5 in which the open end of said receptacle means is chamfered inwardly from the outside wall surface to the inside wall surface.

7. Component holder means in accordance with claim 6 in which the closed end of said receptacle means is constructed to contain continuations of the slots cut in the side wall of said receptacle means.

8. Component holder means mountable upon a mounting board and comprising:

receptacle means having a cylindrically shaped side wall opened at one end and substantially closed at the other end;

said side wall being divided into arcuate segments by slots running along the entire axial length thereof;

the outside surface of the closed end of said receptacle means being generally concave in shape;

fastening means extending outwardly from the center area of said closed end of said receptacle means;

said fastening means constructed to pass through an opening on said mounting board;

the arcuate segments of the wall of said receptacle means being caused to move inwardly to grip a component inserted therein when the bottom of the receptacle means is forced against the mounting board;

and means comprising said fastening means for maintaining said receptacle means forced against said mounting board.

9. Component holder means in accordance with claim 8 in which the inner surface of said cylindrically shaped side wall is constructed to grip the component inserted therein when said receptacle means is forced against said mounting board.

10. Component holder means in accordance with claim 9 in which the open end of said receptacle means is chamfered inwardly from the outside wall surface to the inside wall surface.

11. Component holder means in accordance with claim 10 in which the closed end of said receptacle means is constructed to contain continuations of the slots cut in the side wall of said receptacle means.

12. Component holder means in accordance with claim 8 in which the inner surface of said cylindrical side wall has a groove formed therein substantially circumferentially around said cylindrical side wall and near the open end of said receptacle means, said groove constructed to grip and hold a lip on a component inserted therein when said component is forced against said mounting board.

13. Component holder means in accordance with claim 12 in which the open end of said receptacle means is chamfered inwardly from the outside wall surface to the inside wall surface.

14. Component holder means in accordance with claim 13 in which the closed end of said receptacle means is constructed to contain continuations of the slots cut in the side wall of said receptacle means.

References Cited in the file of this patent

UNITED STATES PATENTS

| | | |
|---|---|---|
| 2,904,617 | King | Sept. 15, 1959 |
| 2,937,834 | Orenick | May 24, 1960 |
| 2,995,328 | Whitted | Aug. 8, 1961 |
| 3,022,973 | Morrow | Feb. 27, 1962 |

UNITED STATES PATENT OFFICE

CERTIFICATE OF CORRECTION

Patent No. 3,163,393 December 29, 1964

Walter R. Strong, Jr.

It is hereby certified that error appears in the above numbered patent requiring correction and that the said Letters Patent should read as corrected below.

Column 2, line 61, for "cylindrical" read -- cylindrically --; column 3, line 14, for "cuts" read -- cut --.

Signed and sealed this 4th day of May 1965.

(SEAL)
Attest:

ERNEST W. SWIDER
Attesting Officer

EDWARD J. BRENNER
Commissioner of Patents